United States Patent [19]
Jeanes

[11] Patent Number: 4,874,401
[45] Date of Patent: Oct. 17, 1989

[54] GAS SEPARATION MEMBRANES FROM BISPHENOL AF POLYCARBONATES AND POLYESTERCARBONATES

[75] Inventor: Thomas O. Jeanes, Antioch, Calif.

[73] Assignee: The Dow Chemical Company, Midland, Mich.

[21] Appl. No.: 123,495

[22] Filed: Nov. 20, 1987

[51] Int. Cl.$^4$ .............................................. B01D 53/22
[52] U.S. Cl. .......................................... 55/16; 55/68; 55/158; 528/202
[58] Field of Search ............................ 55/16, 68, 158; 210/500.4; 528/196, 202; 556/485; 568/715

[56] References Cited

U.S. PATENT DOCUMENTS

| | | | |
|---|---|---|---|
| Re. 30,351 | 7/1980 | Hoehn et al. | 55/16 |
| 3,256,675 | 6/1966 | Robb | 55/16 |
| 3,615,024 | 10/1971 | Michaels | 210/490 |
| 3,653,180 | 4/1972 | Juliano et al. | 55/158 X |
| 3,709,774 | 1/1973 | Kimura | 55/16 X |
| 3,767,737 | 10/1973 | Lundstrom | 55/158 X |
| 3,945,926 | 3/1976 | Kesting | 264/41 X |
| 4,022,944 | 5/1977 | Bottenbruch et al. | 528/196 X |
| 4,032,309 | 6/1977 | Salemme | 55/158 |
| 4,048,271 | 9/1977 | Kesting | 264/41 |
| 4,075,108 | 2/1978 | Higley et al. | 264/41 X |
| 4,086,310 | 4/1978 | Bottenbruch et al. | 55/158 X |
| 4,132,824 | 1/1979 | Kimura et al. | 55/158 X |
| 4,195,157 | 3/1980 | Mark | 528/174 |
| 4,308,373 | 12/1981 | Mori et al. | 528/202 |
| 4,346,211 | 8/1982 | Krishnan et al. | 528/202 |
| 4,358,624 | 11/1982 | Mark et al. | 568/715 X |
| 4,374,891 | 2/1983 | Ward | 428/220 |
| 4,379,910 | 4/1983 | Mark | 528/202 |
| 4,563,516 | 1/1986 | Schreckenberg et al. | 528/196 |
| 4,565,846 | 1/1986 | Saito et al. | 55/158 X |
| 4,649,207 | 3/1987 | Lau et al. | 556/485 X |
| 4,657,564 | 4/1987 | Lanqsam | 55/158 X |
| 4,717,393 | 1/1988 | Hayes | 55/158 X |

FOREIGN PATENT DOCUMENTS

| | | | |
|---|---|---|---|
| 136621 | 4/1985 | European Pat. Off. | |
| 219878 | 4/1987 | European Pat. Off. | 55/158 |
| 66880 | 6/1978 | Japan | 55/16 |
| 8506 | 1/1983 | Japan | 55/158 |
| 8511 | 1/1983 | Japan | 55/158 |
| 59-22724 | 2/1984 | Japan | |
| 59-120206 | 7/1984 | Japan | |
| 177120 | 10/1984 | Japan | 55/16 |
| 62-204824 | 9/1987 | Japan | |
| 529183 | 9/1976 | U.S.S.R. | |
| 2011804 | 7/1979 | United Kingdom | |

OTHER PUBLICATIONS

Pilato et al., "Polymers for Permselective Membrane Gas Separations," Polymer Preprints, ACS, vol. 16, No. 2, Aug. 1975, pp. 41-46.

Maruyama et al., "Synthesis and Properties of Polyarylates from 2,2-bis(4-hydroxyphenyl)-1,1,1,3,3,3-hexafluoropropane and Aromatic Diacid Chlorides," Journal of Polymer Science: Part A: Polymer Chemistry Edition, John Wiley & Sons, vol. 24, 1986, pp. 3555-3558.

Muruqanandam, University of Texas at Austin, Paper entitled "Absorption and Transport in Substituted Polycarbonates and Polystyrene/Tetramethyl Polycarbonate Blends", 10/28-29/85.

Hellums et al., "Advanced Polycarbonate and Polysulfone Materials for Membrane-Based Gas Separation Applications," presented at the Second Annual North American Membrane Society Meeting, Syracuse, New York, Jun. 1-3, 1988.

Koros, "Research Group Report," presented to sponsors of the Separation Research Program at the University of Texas at Austin, Oct. 21-22, 1986.

Koros et al., "Synthesis and Analysis of Novel Polymers with Potential for Providing Both High Permselectivity and Permeability in Gas Separations,"a copy of a D.O.E. funding proposal, was distributed to sponsors of the Separation Research Program at the Univ. of Austin by Oct. 21-22, 1986.

Primary Examiner—Robert H. Spitzer

[57] ABSTRACT

The invention relates to a gas separation membrane comprising a thin discriminating layer of bisphenol AF polycarbonate or polyestercarbonate.

The invention further relates to a method of separating gases comprising (a) contacting with a feed gas mixture under pressure one side of a semi-permeable membrane comprising a thin discriminating layer of polycarbonate or polyestercarbonate, wherein the diphenolic residue in the polymer backbone is based on bisphenol AF;

(b) maintaining a pressue differential across the membrane under conditions such that a component(s) of the feed gas selectively permeates through the membrane from the high pressure side to the low pressure side of the membrane;

(c) removing the permeated gas which is enriched in the faster permeating component(s) from the low pressure side of the membrane;

(d) removing the nonpermeated gas which is depleted in the faster permeating component(s) from the high pressure side of the membrane.

28 Claims, No Drawings

GAS SEPARATION MEMBRANES FROM BISPHENOL AF POLYCARBONATES AND POLYESTERCARBONATES

BACKGROUND OF THE INVENTION

This invention relates to semi-permeable membranes substantially derived from bisphenol AF polycarbonates and polyestercarbonates. This invention further relates to the use of these membranes to separate gases.

The use of membranes to separate gases is well known in the art. Membranes have been used to recover or isolate a variety of gases, including hydrogen, helium, oxygen, nitrogen, carbon dioxide, methane, and light hydrocarbons. Particular applications of interest include the separation of carbon dioxide from light hydrocarbons or other crude oil components as part of the tertiary oil recovery process. In other embodiments, nitrogen or helium is separated from natural gas. Other applications include the recovery of an enriched oxygen stream from air for use in enhanced combustion processes. Alternately, an enriched nitrogen stream may be obtained from air for use as an inert atmosphere over flammable fluids or for food storage.

Such membrane separations are based on the relative permeability of two or more gaseous components through the membrane. To separate a gas mixture into two portions, one richer and one leaner in at least one component, the mixture is brought into contact with one side of a semi-permeable membrane through which at least one of the gaseous components selectively permeates. A gaseous component which selectively permeates through the membrane passes through the membrane more rapidly than the other component(s) of the mixture. The gas mixture is thereby separated into a stream which is enriched in the selectively permeating component(s) and a stream which is depleted in the selectively permeating component(s). The stream which is depleted in the selectively permeating component(s) is enriched in the relatively nonpermeating component(s). A relatively nonpermeating component permeates more slowly through the membrane than the other component(s). An appropriate membrane material is chosen for the mixture so that some degree of separation of the gas mixture can be achieved.

Membranes for gas separation have been fabricated from a wide variety of polymeric materials, including cellulose triacetate; polyolefins such as polyethylene, polypropylene, and poly-4-methylpentene-1; and polysulfone. An ideal gas separation membrane is characterized by the ability to operate under high temperature and/or pressure while possessing a high separation factor (selectivity) and high gas permeability. The problem is finding membrane materials which possess all the desired characteristics. Polymers possessing high separation factors generally have low gas permeabilities, while those polymers possessing high gas permeabilities generally have low separation factors. In the past, a choice between a high separation factor and a high gas permeability has been unavoidably necessary. Furthermore, some of the membrane materials previously used have suffered from the disadvantage of poor performance under high operating temperatures and pressures. A membrane which possesses high selectivity, high gas permeability, and ability to operate under extreme conditions of temperature and pressure is needed.

SUMMARY OF THE INVENTION

The invention relates to a gas separation membrane comprising a thin discriminating layer of polycarbonate or polyestercarbonate, wherein the diphenolic residue in the polymer backbone is based on bisphenol AF.

The invention further relates to a method of separating gases comprising (a) contacting with a feed gas mixture under pressure one side of a semi-permeable membrane comprising a thin discriminating layer of polycarbonate or polyestercarbonate, wherein the diphenolic residue in the polymer backbone is based on bisphenol AF;

(b) maintaining a pressure differential across the membrane under conditions such that a component(s) of the feed gas selectively permeates through the membrane from the high pressure side to the low pressure side of the membrane;

(c) removing the permeated gas which is enriched in the faster permeating component(s) from the low pressure side of the membrane; and (d) removing the nonpermeated gas which is depleted in the faster permeating component(s) from the high pressure side of the membrane.

The membranes of this invention possess high selectivities for oxygen/nitrogen separation and carbon dioxide/methane separation. The membranes of this invention also possess good mechanical properties so as to enable operation of the membranes at high temperatures and pressures.

DETAILED DESCRIPTION OF THE INVENTION

The gas separation membranes of this invention are prepared from polycarbonates or polyestercarbonates, wherein the diphenolic residue in the polymer backbone is based on bisphenol AF. Polyestercarbonates contain both ester and carbonate linkages as functional groups in the polymer backbone. The polyestercarbonates of this invention are randomized copolymers, in which the ester and carbonate functional groups occur in a random arrangement along the polymer backbone.

The polycarbonates or polyestercarbonates used in the invention preferably correspond to Formula 1:

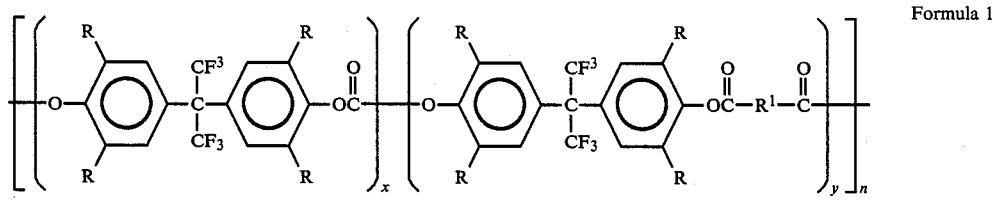

Formula 1 wherein
R is independently in each occurrence hydrogen, a halogen, a $C_{1-6}$ alkyl, a $C_{1-6}$ haloalkyl, or a $C_{1-4}$ alkoxy;

$R^1$ is independently in each occurrence a divalent unsubstituted or halo-substituted $C_{1-20}$ hydrocarbon;

x is a positive real number from about 0.05 to 1.0, y is a positive real number from 0 to about 0.95, with the proviso that the ratio of ester to carbonate groups is between about 50 to about 0 percent; and n is a positive real number of about 20 or greater.

In Formula 1, R is preferably hydrogen, chlorine, bromine, fluorine, a $C_{1-4}$ alkyl, a $C_{1-4}$ haloalkyl, methoxy, ethoxy; R is more preferably hydrogen, chlorine, bromine, fluorine, methyl, ethyl, methoxy, or ethoxy.

In Formula 1, $R^1$ is preferably a divalent unsubstituted or halo-substituted $C_{1-18}$ aliphatic, a divalent unsubstituted or halo-substituted $C_{5-20}$ cycloaliphatic, or a divalent unsubstituted or halo-substituted $C_{6-20}$ aromatic. More preferably, $R^1$ is described by Formulas 2-5:

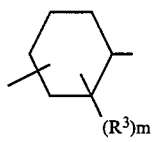

Formula 2

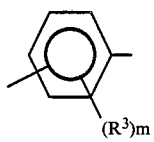

Formula 3

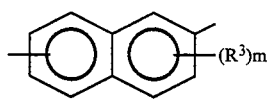

Formula 4

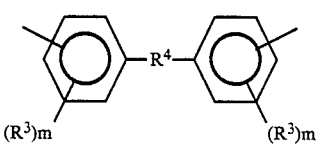

Formula 5 wherein $R^3$ independently in each occurrence a halogen, an unsubstituted or halo-substituted $C_{1-4}$ alkyl, or phenyl; and m is independently in each occurrence a positive integer from 0 to 4. $R^4$ is a $C_{1-6}$ divalent unsubstituted or halo-substituted alkyl. Most preferably, $R^1$ is described by Formula 3:

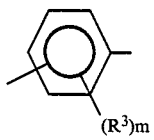

Formula 3

In Formula 1, x is preferably from about 0.67 to 1.0, more preferably from about 0.75 to 1.0. y is preferably from 0 to about 0.33, more preferably from 0 to about 0.25. The ratio of ester to carbonate groups in the polyestercarbonates is preferably from about 50 to about 0 percent, more preferably from about 40 to about 0 percent.

n preferably is about 20 or greater, more preferably about 50 or greater.

The polycarbonates and polyestercarbonates useful in this invention are prepared from bisphenol AF, that is 1,1,1,3,3,3-hexafluoro-2,2-bis-(4-hydroxyphenyl)propane, or its substituted derivatives, which correspond to Formula 7:

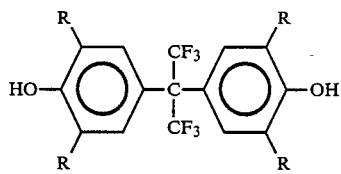

Formula 7 wherein R is independently in each occurrence hydrogen, a halogen, a $C_{1-6}$ alkyl, a $C_{1-6}$ haloalkyl, or a $C_{1-4}$ alkoxy.

R is preferably hydrogen, chlorine, bromine, fluorine, a $C_{1-4}$ alkyl, a $C_{1-4}$ haloalkyl, methoxy, ethoxy; R is more preferably hydrogen, chlorine, bromine, fluorine, methyl, ethyl, methoxy, or ethoxy. The manufacture of bisphenol AF and its derivatives is known in the art. See U.S. Pat. Nos. 4,358,624 and 4,649,207, incorporated herein by reference.

The polycarbonates useful in this invention may be prepared by any process known in the art which results in polycarbonates with suitable membrane formation properties. For example, polycarbonates may be produced by the reaction of phosgene and the appropriate bisphenol in the presence of an HCl acceptor such as pyridine. Polycarbonates may also be prepared by a transesterification reaction between the appropriate bisphenol and a carbonate ester such as diphenyl carbonate. See *Kirk-Othmer Encyclopedia of Chemical Technology*, 3rd edition, John Wiley & Sons, New York, 1982, Vol. 18, pp. 479-494 and Ferdinand Rodriguez, *Principles of Polymer Systems*, 2nd edition, Hemisphere Publishing Corporation, McGraw-Hill Book Company, 1982, pp. 433-436; the relevant portions incorporated herein by reference.

The polyestercarbonates useful in this invention may be prepared by reacting the appropriate bisphenol with a difunctional ester forming agent in the presence of phosgene. Preferred ester forming agents are dicarboxylic acids or dicarboxylic acid halides such as $C_{1-20}$ hydrocarbons substituted with two carboxylic acid or carboxylic acid halide moieties. More preferred dicarboxylic acids or dicarboxylic acid halides include $C_{1-20}$ aliphatic dicarboxylic acids, $C_{1-20}$ aliphatic dicarboxylic acid halides, $C_{5-20}$ cycloaliphatic carboxylic acids, $C_{5-20}$ cycloaliphatic carboxylic acid halides, $C_{6-20}$ aromatic carboxylic acids, $C_{6-20}$ aromatic carboxylic acid halides, $C_{1-20}$ aliphatic dicarboxylic acids, $C_{1-20}$ aliphatic dicarboxylic acid halides, $C_{5-20}$ cycloaliphatic carboxylic acids, $C_{5-20}$ cycloaliphatic carboxylic acid halides, $C_{6-20}$ aromatic carboxylic acids, and $C_{6-20}$ aromatic carboxylic acid halides.

The most preferred class of ester forming agents is the dicarboxylic acid halides. Preferred dicarboxylic acid halides include those corresponding to Formulas 8-11:

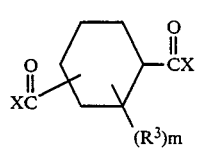

Formula 8

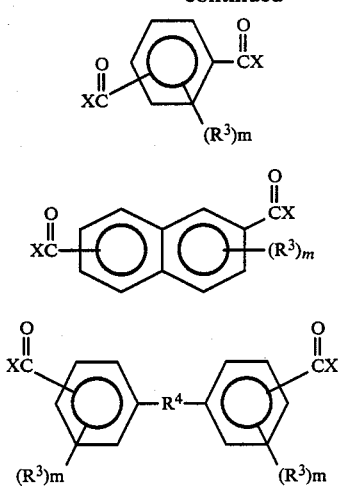

Formula 9

Formula 10

Formula 11 wherein X is a halogen and $R^3$ and m are as previously defined. Preferred dicarboxylic acid halides useful in this invention include 1,4-cyclohexane dicarboxylic acid chloride, 1,4-cyclohexane dicarboxylic acid bromide, 1,3-cyclohexane dicarboxylic acid chloride, or 1,3-cyclohexane dicarboxylic acid bromide, terephthaloyl chloride, terephthaloyl bromide, isophthaloyl chloride, isophthaloyl bromide, 2,6-naphthylene dicarboxylic acid chloride, or 2,6-naphthylene dicarboxylic acid bromide. The more preferred class of dicarboxylic acid halides is the dicarboxylic acid chlorides. Preferred acid chlorides are terephthaloyl chloride, isophthaloyl chloride, 1,4-cyclohexane dicarboxylic acid chloride, and 2,6-naphthylene dicarboxylic acid chloride. The most preferred diacarboxylic acid chlorides are terephthaloyl chloride, isophthaloyl chloride, or mixtures thereof.

In a preferred embodiment in which a mixture of terephthaloyl chloride and isophthaloyl chloride is used as the ester forming agent, the ratio of terephthaloyl chloride to isophthaloyl chloride may be from 100:0 to 0:100, preferably from about 80:20 to about 20:80.

Generally a chain stopping agent is added to the reaction mixture to control molecular weight and viscosity. The molecular weight of the polymers useful in this invention is preferably greater than about 7,500, more preferably greater than about 10,500. The inherent viscosity of the polymers useful in this invention is preferably from about 0.2 to about 1.5, more preferably from about 0.25 to about 0.80.

The polyestercarbonates of this invention may be prepared by techniques known in the art. The solution process is one preferred process for the manufacture of the polyestercarbonates which are the subject of this invention. In the solution process, the bisphenol in a chlorinated solvent in the presence of a tertiary amine acid acceptor is contacted with a dicarboxylic acid or acid chloride in the presence of phosgene with agitation. See U.S. Pat. Nos. 3,028,365; 4,194,038; and 4,310,652; all incorporated herein by reference. See also P. W. Morgan, *Condensation Polymers: By Interfacial and Solution Methods*, Interscience, 1965, pages 325–393, the relevant portions incorporated herein by reference.

In another preferred process for preparing polyestercarbonates, the interfacial process, an aqueous bisphenolate solution with a pH of at least about 8 is mixed with phosgene and an organic solution of an acid halide which solution is immiscible with the aqueous bisphenolate solution. The said components are agitated for a sufficient time at a temperature so as to react the phosgene and the acid halide with the bisphenolate to form an amorphous polymer. The aqueous phase containing the amorphous polymer is separated from the organic phase. The organic phase is then washed with an aqueous liquid. An amorphous, melt-processable polyestercarbonate polymer is recovered from the washed organic phase. The organic phase may be based upon any conventional organic solvent for the product polymer. A preferred group of solvents includes chlorinated aliphatic $C_{1-4}$ hydrocarbons such as methylene chloride, dichloromethane, chloroform, carbon tetrachloride, dichloroethane, trichloroethane, trichloroethylene, tetrachloroethylene, and mixtures thereof. Another preferred group of solvents includes chlorinated and non-halogenated aromatic hydrocarbons such as toluene, chlorobenzene, dichlorobenzene, and mixtures thereof. Preferred solvents are the chloromethanes, especially dichloromethane. The bisphenols useful in this invention are converted to bisphenoates by dissolving the bisphenol in water with an inorganic base, especially in an aqueous or alkaline earth metal hydroxide, preferably an alkali metal hydroxide, and more preferably sodium hydroxide. Further descriptions of the interfacial processes can be found in U.S. Pat. Nos. 3,169,121; 3,030,331; 3,028,364; 4,137,128; 4,156,069; 3,207,814; 4,255,556; and 4,311,822; all incorporated herein by reference. See also P. W. Morgan, supra.

The ratio of acid halide to phosgene generally controls the relative ratio of ester to carbonate units, with a higher ratio of acid halides resulting in a higher ester content and a lower ratio of acid halides resulting in a lower ester content. Generally, the molar ratio of phosgene to acid halide or carboxylic acid is between about 0.02:1 to about 20:1.

The membranes of this invention may be homogenous, composite, or asymmetric membranes. Preferably, the membranes of this invention are asymmetric or composite. In addition, the membranes may be shaped in the form of flat sheets, hollow fibers, or hollow tubes.

Homogeneous membranes are prepared by forming a thin discriminating layer which is dense and free of voids and pores. Such membranes generally have the same structure and composition throughout the membrane. In one preferred embodiment, the polycarbonate and polyestercarbonates of this invention are dissolved in a water-miscible solvent, for example, dimethylformamide or dimethylacetamide. Additional solvents suitable for forming membranes include chlorinated hydrocarbons such as methylene chloride, chloroform, trichloroethane, trichloroethylene, tetrachloroethylene, and the like. The configuration into which the membrane is to be formed determines the membrane solution composition. To form a flat sheet membrane, a solution with about 10 to 20 weight percent of polymer is preferred, with about 15 to 20 weight percent of polymer being more preferred. To form a hollow fiber membrane, a solution with about 30 to 80 weight percent polymer is preferred, with about 50 to 80 weight percent of polymer being more preferred.

The polymer solution should be homogeneous and possess sufficient viscosity to allow casting of the solution onto a flat surface. The casting surface is such that the finished membrane may thereafter be readily separated. One way of carrying out this operation is by casting the polymer solution onto a support surface which may be dissolved away from the finished membrane following drying and curing. Alternately, the membrane may be cast onto a support having a low surface energy, such as silicone, coated glass, or a surface to which the membrane will not adhere, such as mercury. Casting is performed by pouring the solution onto the appropriate surface and drawing down the polymer soluting using an appropriate tool to form a solution of the appropriate thickness.

Thereafter, the cast solution is exposed to drying or curing conditions. Such conditions are used to remove the solvent, thereby leaving a thin discriminating layer of polymer which is homogeneous. The solution may be dried by exposing the solution to a vacuum, exposing the solution to elevated temperatures, allowing the solvent to evaporate from the solution over time, or a combination thereof. Generally, it is preferable to expose the cast solution to elevated temperatures. Any temperature at which the solvent evaporates in a reasonable period of time and below the glass transition temperature is suitable, preferably less than about 100 degrees Celsius, more preferably less than about 80 degrees Celsius. In one preferred embodiment, such exposure is done under vacuum at elevated conditions. This drying is performed over a period sufficient to remove the solvent, preferably between 24 to 48 hours.

Homogeneous polycarbonate and polyester-carbonate membranes may alternately be formed by the melt extrusion process. The polymers may be extruded and drawn down into films using conventional extrusion equipment. Typically, the polymers of this invention may be extruded at temperatures from about 220° to about 300° C.

In a composite membrane, the thin discriminating layer of the membrane is supported on a porous substructure or substrate. The porous substrate generally does not greatly impede the transport of components through the membrane. To prepare a composite membrane, a homogeneous, thin discriminating layer can be formed and thereafter adhered to a porous support after formation. Alternatively, the porous support can be the surface upon which the membrane is cast or laminated. In one embodiment, the composite membrane is prepared by casting or laminating a forming solution as a uniform coating on the porous support which forms the support layer for the finished membrane. Penetration of the polymer into pores of the porous support layer is operable so long as the desired thickness of the semi-permeable membrane is not exceeded. In one embodiment, the support layer may be a metal or polymeric plate with a plurality of holes drilled into it. However, such a drill plate is not advantageous because it can significantly reduce the effective surface area of the membrane. In a preferred embodiment, the porous support layer is a very porous polymer membrane. Illustrative of such polymeric support layers are porous cellulose ester and microporous polysulfone membranes. Such membranes are commercially available under the tradenames MILLIPORE, PELLICON, and DIAFLOW. Where such support membranes are thin or highly deformable, a screen or other support frame may also be necessary to adequately support the semi-permeable membrane. In one especially perferred embodiment, the polymeric support layer is in the form of a hollow fiber of a microporous polymer such as cellulose ester or polysulfone. The hollow fiber itself provides adequate support for the thin discriminating layer coated on the inside or the outside of the hollow fiber.

After the thin discriminating layer is coated onto the porous support, the composite membrane is exposed to conditions for removal of the solvent so as to form the dense skin. Such conditions are similar to those hereinbefore described for the formation of homogenous membranes.

To form an asymmetric membrane, a solution is cast as hereinbefore described, and thereafter the cast solution is partially cured to remove a portion of the solvent. Thereafter, one or both surfaces of the partially dried membrane is contacted with a quench liquid such as water so as to form a thin discriminating layer on one or both sides of the membrane, under conditions such that the solvent away from the dense layer communicates to the dense layer forming pores in the remainder of the membrane, thereby forming an asymmetric membrane. Such porous layer is present to provide support for the thin discriminating layer without impeding the transport of the fluid containing the components to be separated by the semi-permeable, thin discriminating layer. The parital curing step is performed in a manner similar to the curing step described with respect to the formation of homogeneous membranes.

Hollow fiber membranes can be formed by spinning fibers from an appropriate solution of the polycarbonate or polyestercarbonate in a water-miscible solvent or by melt extrusion. Such spinning processes are well known to those skilled in the art, and the formation of homogeneous, asymmetric, or composite membranes requires the adaptation of the hereinbefore described procedures to the hollow fiber membrane form. Such adaptations are well within the skill of the art.

The membranes used in the invention are relatively thin. The thickness of such homogeneous membranes is preferably greater than about 5 microns and less than about 500 microns. More preferably, the membrane thickness for a homogeneous membrane is between about 10 and about 300 microns. In the case of composite or asymmetric membranes, the active discriminating layer is preferably between about 0.05 and 10 microns, more preferably between about 0.05 and 5 microns.

The membranes are fabricated into flat sheet, spiral, tubular, or hollow fiber devices by methods described in the art. The membranes are sealingly mounted in a pressure vessel in such a manner that the membrane separates the vessel into two fluid regions wherein fluid flow between the two regions is accomplished by fluid permeating through the membrane. For examples of conventional membrane device designs and fabrication methods see U.S. Pat. Nos. 3,228,876; 3,433,008; 3,455,460; 3,475,331; 3,526,001; 3,538,553; 3,690,465; 3,702,658; 3,755,034; 3,801,401; 3,872,014; 3,966,616; 4,045,851; 4,061,574; 4,080,296; 4,083,780; 4,220,535; 4,235,723; 4,265,763; 4,430,219; 4,352,092; 4,337,139; and 4,315,819; all incorporated herein by reference.

The membranes are used to isolate or recover gases from gas mixtures. The feed gas mixture may contain gases such as hydrogen, helium, oxygen, nitrogen, carbon dioxide, methane, light hydrocarbons, and the like. One side of the membrane is contacted with a feed gas mixture under pressure, while a pressure differential is maintained across the membrane. At least one of the components in any given gas mixture selectively permeates through the membrane more rapidly than the other component(s). A stream is obtained on the low pressure side of the membrane which is enriched in the faster permeating component(s). The permeated gas is removed from the low pressure (downstream) side of the membrane. A stream depleted in the faster permeating gas is withdrawn from the high pressure (upstream) side of the membrane.

The separation process should be carred out at pressures which do not adversely affect the membrane. In the case where oxygen is separated from nitrogen, the pressure differential across the membrane is preferably between about 10 and 350 psig, more preferably between about 50 and 250 psig. In the case where carbon dioxide is separated from methane, the pressure differential across the membrane is preferably between about 50 and 1000 psig, more preferably between about 50 and 500 psig. The separation process should be carried out at temperatures which do not adversely affect membrane integrity. Under continuous operation, the operating temperature is preferably from about 0 to 100 degrees Celsius, more preferably from about 0 to 50 degrees Celsius.

$$P = \frac{\text{Gas permeability is defined as}}{\text{(area) (time) (driving force across the membrane)}}.$$

A standard permeability measurement unit is the barrer, which is $$\frac{(\text{centimeter})^3 \ (STP) \ (\text{centimeter})}{(\text{centimeter})^2 \ (\text{second}) \ (\text{centimeter Hg})} \times 10^{10}$$

abbreviated hereinafter as $\frac{cm^3 \ (STP) \ cm}{cm^2 \ s \ cm \ Hg} \times 10^{10}$.

The reduced flux is defined as (permeability) (membrane thickness). A standard reduced flux unit is $$\frac{(\text{centimeter})^3 \ (STP)}{(\text{centimeter})^2 \ (\text{second}) \ (\text{centimeter Hg})} \text{ hereinafter}$$

abbreviated as $\frac{cm^3 \ (STP)}{cm^2 \ s \ cm \ Hg}$.

The separation factor (selectivity) is defined as the ratio of the permeability of the faster permeating gas to the permeability of the slower permeating gas.

In the embodiment where oxygen is separated from nitrogen, the membrane preferably has a separation factor for oxygen/nitrogen at about 25 degrees Celsius of about 3.5 or greater, more preferably of about 4.0 or greater. The permeability of oxygen at about 25 degrees Celsius is preferably of about 2.0 Barrers or greater, more preferably of about 2.5 Barrers or greater. The reduced flux of oxygen at about 25 degrees Celsius is preferably about $$5 \times 10^{-8} \frac{cm^3 \ (STP)}{cm^2 \ sec \ cm \ Hg}, \text{ more preferably}$$

$$8 \times 10^{-8} \frac{cm^3 \ (STP)}{cm^2 \ sec \ cm \ Hg}.$$

In the embodiment where carbon dioxide is separated from methane, the membrane preferably has a separation factor for carbon dioxide/methane at about 25 degrees Celsius of at least about 16, more preferably of at least about 21. The permeability of carbon dioxide at about 25 degrees Celsius is at least about 9 Barrers, more preferably at least about 12 Barrers. The reduced flux of carbon dioxide at about 25 degrees Celsius is preferably about $$1 \times 10^{-7} \frac{cm^3 \ (STP)}{cm^2 \ sec \ cm \ Hg}, \text{ more preferably about}$$

$$2.5 \times 10^{-7} \frac{cm^3 \ (STP)}{cm^2 \ sec \ cm \ Hg}.$$

SPECIFIC EMBODIMENTS

The following examples are included to illustrate the invention and are not intended to limit the scope of the invention or claims.

EXAMPLE 1

Bisphenol AF Based Polycarbonate Polymerization

A three neck, 2.0 liter round bottom flask, equipped with a thermometer, stirrer, and glass funnel, is charged with 1.2 liters of methylene chloride, 185.6 grams (0.55 moles) of 1,1,1,3,3,3-hexafluoro-2,2-bis-(4-hydroxy phenyl)propane (bisphenol AF), and 116.8 cc (1.44 moles) of pyridene. The resultant clear, pale pink solution is stirred under a nitrogen atmosphere for 10 minutes. Moderate stirring is continued while a total of 68 grams (0.69 moles) of phosgene is bubbled into the solution over a period of 41 minutes.

The creamy, pale yellow solution is then scavenged with methanol, neutralized with dilute hydrochloric acid, and washed a second time with dilute hydrochloric acid. The colorless, slightly hazy solution is clarified by passing it through an MSC resin bed, further diluted with methylene chloride, and precipitated in 4 volumes of n-heptane. The precipitated polymer is dried under vacuum at 80 degrees Celsius for 48 hours. The resultant polymer has an inherent viscosity of 0.67 dL/g at 25 degrees Celsius in methylene chloride.

Film Preparation and Testing 2 grams of dried polymer are dissolved in 18 grams of methylene chloride to form a casting solution. The casting solution is passed through a fritted glass filter onto a clean glass plate and drawn down with a casting blade. The film is covered until dry, removed from the glass plate, and annealed under vacuum at 80 degrees Celsius for 48 hours.

From the cast film, a small disc is cut to provide a sample for gas permeability evaluation. The mean thickness and standard deviation are determined and the sample is placed in a gas permeation test cell of a fixed volume-variable pressure gas permeability test apparatus. Both sides of the membrane are evacuated overnight. One side of the membrane is then pressurized with oxygen at 150 kPaG and the downstream pressure increase is monitored with a pressure transducer and recorded on a single-pen recorder. Gas permeability coefficients and standard deviation are calculated from the slope of the time-pressure curve.

The same procedure is followed for each of the following gases: nitrogen, methane, helium, and carbon dioxide. The results are listed in Tables IA, IB, and II.

EXAMPLE 2

Bisphenol AF Based Polyestercarbonate

The polymerization step is similar to that of Example 1, except that 50% of the phosgene (0.345 moles) is replaced with an 80:20 mixture of terephthaloyl chloride:isophthaloyl chloride. A film is prepared in a manner similar to that described in Example 1 and gas permeabilities are determined for oxygen, nitrogen, methane, helium, and carbon dioxide. Results are listed in Tables IA, IB, and II.

EXAMPLE 3

Bisphenol A Based Polycarbonate

This Example does not illustrate the invention but is meant to compare the gas separation performance of bisphenol AF polycarbonates with that of bisphenol A polycarbonates.

The procedure of Example 1 is used except that bisphenol A is used in place of the 1,1,1,3,3,3-hexafluoro-2,2-bis(4-hydroxy phenyl)propane (bisphenol AF).

The results of gas permeability measurements for oxygen, nitrogen, methane, and carbon dioxide are listed in Tables IA, IB, and II.

EXAMPLE 4

Bisphenol A Based Polyestercarbonate

This Example does not illustrate the invention but is meant to compare the gas separation performance of bisphenol AF polyestercarbonates with that of bisphenol A polyestercarbonates.

The procedure of Example 2 is used except that bisphenol A is used in place of the 1,1,1,3,3,3-hexafluoro-2,2-bis(4-hydroxyphenyl)propane (bisphenol AF).

The results of gas permeability measurements for oxygen and nitrogen are listed in Tables IA, IB, and II.

TABLE IA

GAS PERMEABILITIES[1]

Membrane

| Example | Thickness (mils) | Oxygen | Nitrogen | Methane | Carbon Dioxide | Helium |
|---|---|---|---|---|---|---|
| 1 | 2.10 | 3.37 | 0.69 | 0.51 | 14.2 | 31.9 |
| 2 | 1.92 | 3.96 | 0.95 | 0.77 | 17.7 | 31.4 |
| 3 | 5.14 | 1.06 | 0.20 | 0.23 | 5.54 | — |
| 4 | 2.04 | 1.16 | 0.26 | — | — | — |

[1] Gas permeability values in units of barrers ($cm^3$-cm/($cm^2$ s cm Hg) × $10^{10}$

TABLE IB

REDUCED FLUX[1]

| Example | Membrane Thickness (mils) | Oxygen | Nitrogen | Methane |
|---|---|---|---|---|
| 1 | 2.10 | 6.32 × $10^{-8}$ | 1.29 × $10^{-8}$ | 9.56 × $10^{-9}$ |
| 2 | 1.92 | 8.12 × $10^{-8}$ | 1.95 × $10^{-8}$ | 1.58 × $10^{-8}$ |
| 3 | 5.14 | 8.12 × $10^{-9}$ | 1.53 × $10^{-9}$ | 1.76 × $10^{-9}$ |
| 4 | 2.04 | 2.24 × $10^{-8}$ | 4.93 × $10^{-9}$ | — |

| | Carbon Dioxide | Helium |
|---|---|---|
| | 2.66 × $10^{-7}$ | 5.98 × $10^{-7}$ |
| | 3.63 × $10^{-7}$ | 6.44 × $10^{-7}$ |

TABLE IB-continued

[1] Reduced flux values in units of $\frac{cm^3 \text{ (STP)}}{cm^2 \text{ sec cm HG}}$

TABLE II

SEPARATION FACTORS

| Example | $O_2/N_2$ | $CO_2/CH_4$ | $He/CH_4$ |
|---|---|---|---|
| 1 | 4.9 | 27.8 | 62.3 |
| 2 | 4.2 | 23.0 | 41.0 |
| 3 | 5.3 | 24.1 | — |
| 4 | 4.6 | — | — |

What is claimed is:

1. A method of separating gases comprising
   (a) contacting with a feed gas mixture under pressure one side of a semi-permeable membrane comprising a thin discriminating layer of polycarbonate or polyestercarbonate, wherein the diphenolic residue in the polymer backbone is based on bisphenol AF;
   (b) maintaining a pressure differential across the membrane under conditions such that a component(s) of the feed gas selectively permeates through the membrane from the high pressure side to the low pressure side of the membrane;
   (c) removing the permeated gas which is enriched in the faster permeating component(s) from the low pressure side of the membrane; and
   (d) removing the nonpermeated gas which is depleted in the faster permeating component(s) from the high pressure side of the membrane.

2. The method of claim 1, wherein the membrane is comprised of a thin discriminating layer of polyestercarbonate corresponding to the formula:

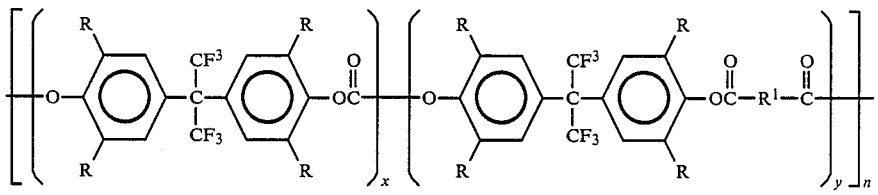

wherein
R is independently in each occurrence hydrogen, a halogen, a $C_{1-6}$ alkyl, a $C_{1-6}$ haloalkyl, or a $C_{1-4}$ alkoxy;
$R^1$ is independently in each occurrence a divalent unsubstituted or halo-substituted $C_{1-20}$ hydrocarbon;
x is a positive real number from about 0.05 to 1.0,
y is a positive real number from 0 to about 0.95, with the proviso that the ratio of ester to carbonate groups is between about 50 to about 0 percent; and
n is a positive real number from about 20 or greater.

3. The method of claim 2, wherein $R^1$ is a divalent unsubstituted or halo-substituted $C_{1-18}$ aliphatic, a divalent unsubstituted or halo-substituted $C_{5-20}$ cycloaliphatic, or a divalent unsubstituted or halo-substituted $C_{6-20}$ aromatic.

4. The method of claim 3, wherein $R^1$ is

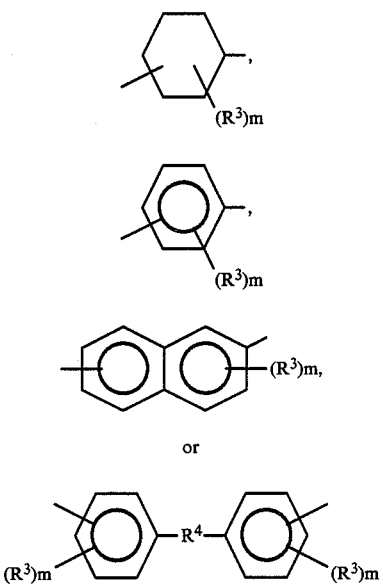

wherein
R³ is independently in each occurrence a halogen, an unsubstituted or halo-substituted C₁₋₄ alkyl, or phenyl;
m is independently in each occurrence a positive integer from 0 to 4; and
R⁴ is a C₁₋₆ divalent unsubstituted or halo-substituted alkyl.

5. The method of claim 4, wherein the polyestercarbonate is derived from bisphenol AF and terephthaloyl chloride, isophthaloyl chloride, or a mixture of terephthaloyl chloride and isophthaloyl chloride.

6. The method of claim 5, wherein R is independently in each occurrence fluorine, a C₁₋₆ haloalkyl, or a C₁₋₄ alkoxy.

7. The method of claim 6, wherein the feed gas mixture contains at least one gaseous component selected from the group of hydrogen, helium, oxygen, nitrogen, carbon dioxide, methane, or light hydrocarbons.

8. The method of claim 7, wherein the separation factor for oxygen/nitrogen is about 3.5 or greater.

9. The method of claim 7, wherein the separation factor for carbon dioxide/methane is about 16 or greater.

10. The method of claim 1, wherein the membrane is comprised of a thin discriminating layer of polycarbonate corresponding to the formula:

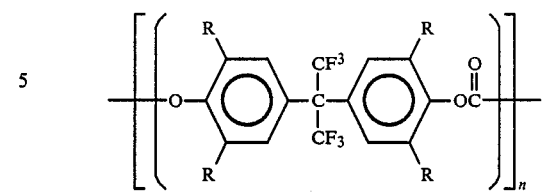

wherein
R is independently in each occurrence hydrogen, a halogen, a C₁₋₆ alkyl, a C₁₋₆ haloalkyl, or a C₁₋₄ alkoxy; and
n is a positive real number from about 20 or greater.

11. The method of claim 10, wherein R is independently in each occurrence fluorine, a C₁₋₆ haloalkyl, or a C₁₋₄ alkoxy.

12. The method of claim 11, wherein the feed gas mixture contains at least one gaseous component selected from the group of hydrogen, helium, oxygen, nitrogen, carbon dioxide, methane, or light hydrocarbons.

13. The method of claim 12, wherein the separation factor for oxygen nitrogen is about 3.5 or greater.

14. The method of claim 12, wherein the separation factor for carbon dioxide/methane is about 16 or greater.

15. A gas separation membrane comprising a thin discriminating layer of polycarbonate or polyestercarbonate, wherein the diphenolic residue in the polymer backbone is based on bisphenol AF, wherein the gas separation membrane functions as a semi-permeable membrane capable of separating at least one gas from a gas mixture.

16. The membrane of claim 15, wherein the membrane is comprised of a thin discriminating layer of polyestercarbonate corresponding to the formula:

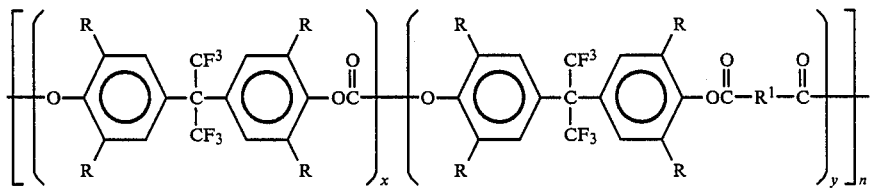

wherein
R is independently in each occurrence hydrogen, a halogen, a C₁₋₆ alkyl, a C₁₋₆ haloalkyl, or a C₁₋₄ alkoxy;
R¹ is independently in each occurrence a divalent unsubstituted or halo-substituted C₁₋₂₀ hydrocarbon;
x is a positive real number from about 0.05 to 1.0,
y is a positive real number from 0 to about 0.95,
with the proviso that the ratio of ester to carbonate groups is between about 50 to about 0 percent; and
n is a positive real number from about 20 or greater.

17. The membrane of claim 16, wherein R¹ is a divalent unsubstituted or halo-substituted C₁₋₁₈ aliphatic, a divalent unsubstituted or halo-substituted C₅₋₂₀ cycloaliphatic, or a divalent unsubstituted or halo-substituted C₆₋₂₀ aromatic.

18. The membrane of claim 17, wherein R¹ is

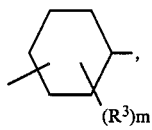

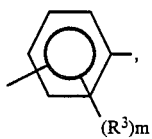

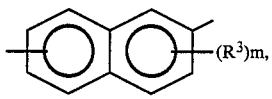

or

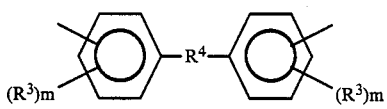

wherein $R^3$ is independently in each occurrence a halogen, an unsubstituted or halo-substituted $C_{1-4}$ alkyl, or phenyl;

m is independently in each occurrence a positive integer from 0 to 4; and $R^4$ is a $C_{1-6}$ divalent unsubstituted or halo-substituted alkyl.

19. The membrane of claim 18, wherein the polyestercarbonate is derived from bisphenol AF and terephthaloyl choride, isophthaloyl chloride or a mixture of terephthaloyl chloride and isophthaloyl chloride.

20. The membrane of claim 19, wherein R is independently in each occurrence fluorine, a $C_{1-4}$ haloalkyl, or a $C_{1-4}$ alkoxy.

21. The membrane of claim 20, wherein the inherent viscosity is from about 0.25 to about 0.80.

22. The membrane of claim 21, wherein the separation factor for oxygen/nitrogen is about 3.5 or greater at 25 degrees Celsius.

23. The membrane of claim 21, wherein the separation factor for carbon dioxide/methane is about 16 or greater at 25 degrees Celsius.

24. The membrane of claim 15, wherein the membrane is comprised of a thin discriminating layer of polycarbonate corresponding to the formula:

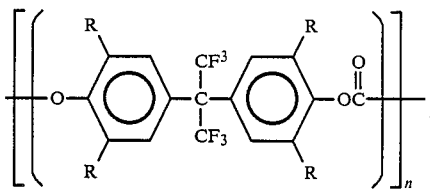

wherein

R is independently in each occurrence hydrogen, a halogen, a $C_{1-6}$ alkyl, a $C_{1-6}$ haloalkyl, or a $C_{1-4}$ alkoxy; and n is a positive real number from about 20 or greater.

25. The membrane of claim 24, wherein R is independently in each occurrence fluorine, a $C_{1-6}$ haloalkyl, or a $C_{1-4}$ alkoxy.

26. The membrane of claim 25, wherein the inherent viscosity is from about 0.25 to about 0.80.

27. The membrane of claim 26, wherein the separation factor for oxygen/nitrogen is about 3.5 or greater at 25 degrees Celsius.

28. The membrane of claim 26, wherein the separation factor for carbon dioxide/methane is about 16 or greater at 25 degrees Celsius.

* * * * *